Feb. 7, 1933.  L. KÜRTÖSSY  1,896,959

AUTOMATIC COUPLING FOR RAILWAY VEHICLES

Filed Oct. 21, 1926  3 Sheets-Sheet 1

Inventor:
L. Kürtössy
By: Marks & Clerk
Attys.

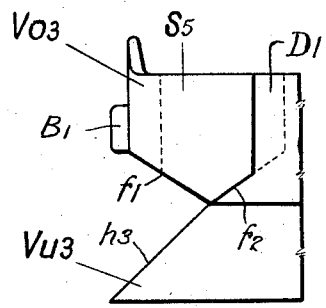
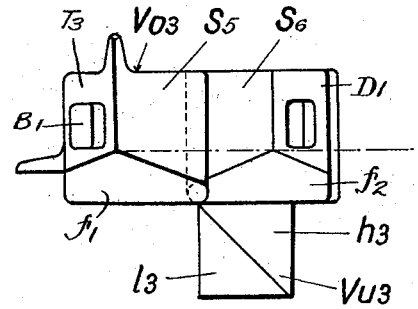
Fig.3c  Fig.3a
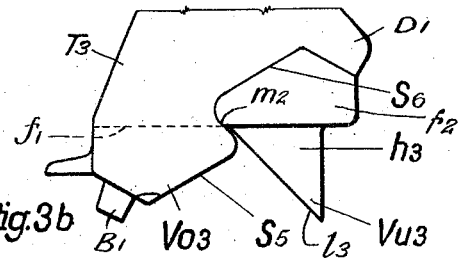
Fig.3b
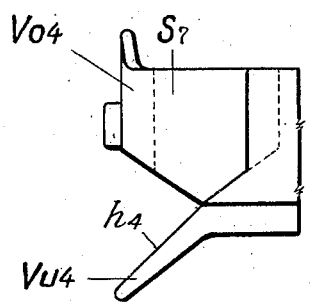
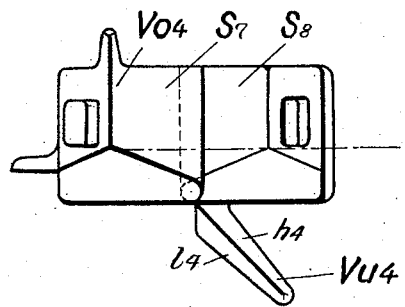
Fig.4c  Fig.4a
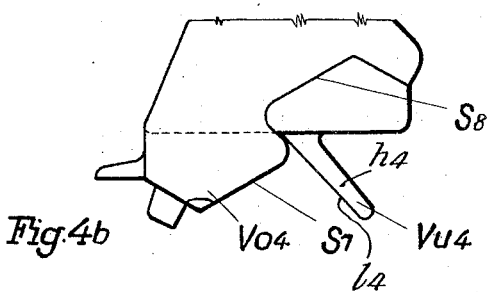
Fig.4b Feb. 7, 1933. L. KÜRTÖSSY 1,896,959
AUTOMATIC COUPLING FOR RAILWAY VEHICLES
Filed Oct. 21, 1926   3 Sheets-Sheet 3

Inventor:
L. Kürtössy
By: Marks & Clerk
Attys.

Patented Feb. 7, 1933

1,896,959

UNITED STATES PATENT OFFICE

LÁSZLÓ KÜRTÖSSY, OF BUDAPEST, HUNGARY

AUTOMATIC COUPLING FOR RAILWAY VEHICLES

Application filed October 21, 1926, Serial No. 143,244, and in Hungary October 28, 1925.

This invention relates to a coupling head, more particularly for railway vehicles, which is suitable for use with a central buffer coupling, serving the purpose both of acting as a buffer and of transmitting the tractive effort. The new coupling head differs from the known coupling heads serving the same purpose by the peculiar arrangement of its guiding surfaces which is such that in proportion to its dimensions the new coupling head has as great a guiding capacity as possible. Consequently for a given guiding capacity the new coupling head may have smaller dimensions and less weight than the known coupling heads.

According to the present invention the coupling head has two opposed projections, of which the upper one has a vertical guiding surface which extends over the entire height of the upper projections and is inclined to the vertical longitudinal central plane of the head and a buffer surface parallel to and offset from the said guiding surface, the guiding and buffer surfaces overlapping in the region of the vertical longitudinal central plane and being connected together by a vertical surface so as to form an engaging member or neb and a recess having the negative shape of the engaging member for the reception of the engaging member of the other head, while the lower projection has a vertical guiding surface inclined to the vertical central longitudinal plane and a guiding surface inclined forwardly and downwardly from the horizontal central longitudinal plane, coupling means being provided for locking the coupling heads in coupled relation for draft. In order to enlarge the guiding capacity the coupling head may in accordance with the invention be provided with separate engaging members.

In the accompanying drawings wherein several constructional forms of the new coupling head are shown:

Fig. 2d is a perspective view of the form of head shown in Fig. 2a.

Fig. 3a is a front elevation, Fig. 3b a top plan view and Fig. 3c a side elevation of a third form of the invention.

Fig. 4a is a front elevation, Fig. 4b a top plan view and Fig. 4c a side elevation of a fourth form of the invention.

Figure 1A:
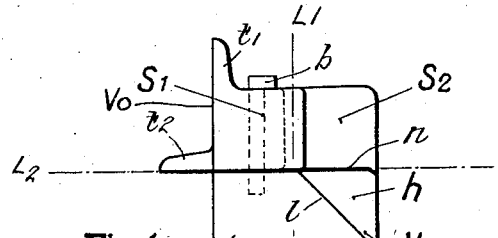
Fig. 1a is a front elevation, Fig. 1b a top plan view and Fig. 1c a perspective view of a coupling head constructed in accordance with the invention.
Figure 1C:
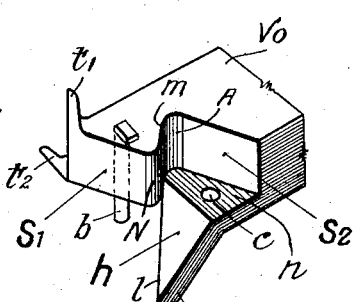
Figure 1B:
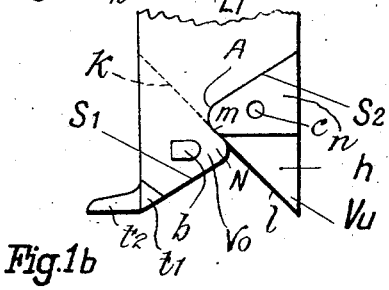
Figure 2A:
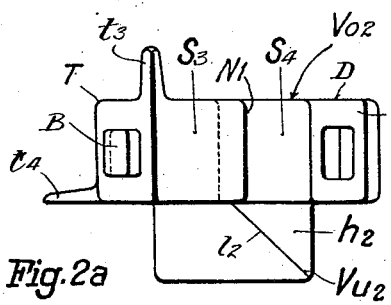
Fig. 2a is a front elevation, Fig. 2b a top plan view of a second form of the invention.
Figure 2C:
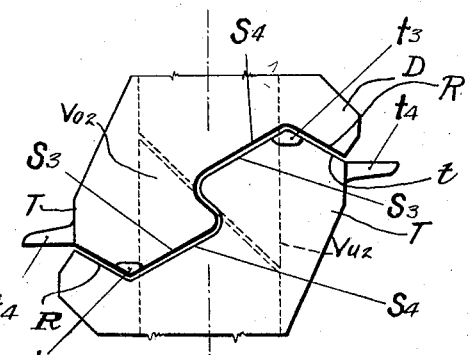
Fig. 2c is a top plan view of two heads of the type shown in Fig. 2a coupled together.
Figure 2B:
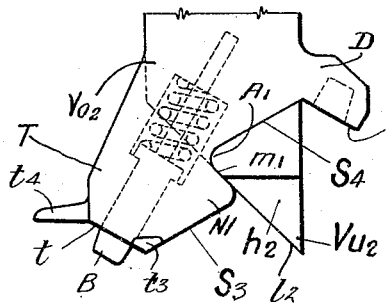
Figure 2D:
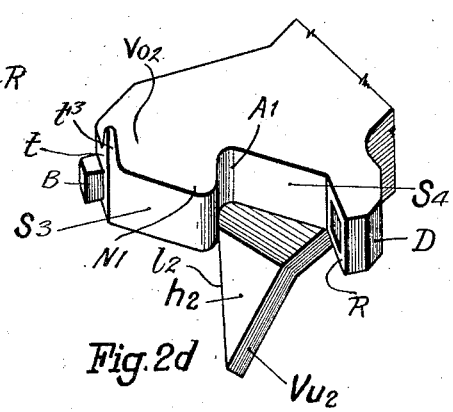

The coupling head shown in Figs. 1a to 1c has two opposed projections $Vo$ and $Vu$, of which the upper projection $Vo$ has a vertical guiding surface $S1$, which extends over the entire height of the upper projection and is inclined to the vertical central longitudinal plane $L1-L1$ of the coupling head and a buffer surface $S2$ parallel to and offset from the surface $S1$. The surfaces $S1$, $S2$ overlap in the region of the plane $L1-L1$, the overlapping portions being connected together by a surface $m$ so as to form an engaging member or neb $N$ and a recess $A$ having the negative shape of the member $N$ for the reception of the engaging member $N$ of the other head. A surface $n$ which lies in or parallel to the horizontal longitudinal central plane $L2$, $L2$ constitutes an abutment for the bottom of the upper projection of the other coupling head. The lower projection $Vu$ of the coupling head has a guiding surface $h$ which is inclined to the horizontal longitudinal central plane $L2-L2$ and a guiding surface 1 which is inclined to the vertical longitudinal central plane $L1-L1$. This latter guiding surface 1 extends only as far as the vertical longitudinal central plane $L1-L1$, without in any way affecting the extent of the guiding capacity. The guiding capacity of the head however is increased by the provision of projecting engaging members $t1-t2$, without the weight of the head being appreciably increased. The extension $t1$ extends vertically from the projection $Vo$ and the extension $t2$ horizontally and laterally of the same.

When two coupling heads of the kind described come into engagement with one another, they are guided laterally into proper position by the lateral guiding surfaces S1 and 1, while in the vertical direction the heads are guided by the surface $h$. After the two heads have slid into complete engagement the upper projection V$o$ of one head rests in the recess A of the second head, formed by offsetting the surfaces S1, S2, while the lower projection V$u$ fits in the space below the projection V$o$, the surface 1 resting against a surface $k$ forming a continuation of the surface 1, the surfaces S1 and S2 of the two heads resting against one another over their entire extent and relatively transmitting the forces in the manner of a buffer. The extensions $t1$—$t2$ increase the guiding capacity, by the edge of the extension $t1$, which is parallel to the guiding surface S1 coacting, when the difference of position in the vertical direction of the two heads is great, with the guiding surface S1 of the other head and by the lower horizontal edge of the extension $t2$ (Fig. 1$a$) coacting, when the horizontal difference of position of the two heads is considerable, with the guiding surface $h$ of the other head. With this arrangement the extension $t1$ acts as a guide in the horizontal direction and the extension $t2$ in the vertical direction. For holding the two coupling heads in coupled relation in the case of the construction shown in Figures 1$a$ to 1$c$, any suitable known type of locking means may be used, as for instance, a coupling pin $b$ mounted in the upper projection of one head engageable in an opening $c$ in the other head. Thus, by offsetting the surfaces S1, S2 and constructing them so as to overlap, the interengaging nebs of the heads transmit, according to the position of the inner neb surface with respect to the longitudinal axis, at least a portion of the tractive effort. In the constructional form shown in Figures 2$a$ to 2$d$, the construction of the upper projection V$o$2 is similar to that of the projection V$o$ in Figs. 1$a$ to 1$c$, the surfaces S3, S4, $m1$ corresponding to the surfaces S1, S2, $m$ and forming a neb N1 and recess A1 corresponding to the neb N and recess A. The lower projection V$u$2 is of the same construction as the lower projection V$u$, the surfaces $h2$ and $l2$ corresponding to the surfaces $h$ and $l$, respectively. Similarly, the members $t3$, $t4$ correspond to the member $t1$, $t2$ of Figs. 1$a$—1$b$. In this constructional form a coupling pin B is located in a lateral boss T on the upper projection V$o$2. The pin B is acted on by a compression spring (shown in Fig. 2$b$ in broken lines) which tends to force the pin forwards. On the opposite side of the coupling head in a boss D a recess is provided at the same level as the pin B, in which the pin of the other coupling head engages, whereby the two heads are connected together. For releasing the coupling the pin is forced backwards in opposition to the spring. The face R of the boss D for receiving the pin and the face $t$ of the projecting part T lying opposite to it on an adjacent head may have any angle to the vertical longitudinal central plane of the head, the angle being preferably such that, after the heads have slid into engagement, the two faces rest against one another, as is shown in Fig. 2$c$. In this case towards the end of the interengagement of the parts the two faces will act as guiding surfaces and, after the heads have come in contact, as buffer surfaces.

The guiding capacity of the coupling head shown in Figs. 3$a$ to 3$c$ is further increased by the lower part of the upper projection V$o$3 being bevelled off so as to provide an additional surface $f1$ which is inclined to the horizontal longitudinal central plane downwardly from front to back. As an abutment for the same surface on the other head, the surface $f2$ is provided which is of necessity placed at the same height as the surface $f1$, is inclined to the horizontal longitudinal central plane and extends upwardly from front to back. The construction of the upper projection V$o$3 is otherwise similar to that of Figs. 2$a$ to 2$d$, the surfaces S5, S6, $m2$ and part T3 corresponding to S3, S4, $m1$ and T and the pin B1 being adapted to take into a recess in the boss D1 in a similar manner to the pin B. In this construction, the coupling head does not have a surface $k$ forming a continuation of the surface $l3$ of the lower projection V$u$3, but the guiding capacity of the head is not thereby diminished in any way. The surface $h3$ is similar to $h2$.

The form of the head may be still further simplified as shown in Figures 4$a$ to 4$c$ by forming the lower projection as a narrow engaging member V$u$4 having narrow surfaces $l4$, $h4$ instead of the surfaces $l3$, $h3$ of Figures 3$a$ to 3$c$, which are comparatively wide. The construction of the upper projection V$o$4 with its surfaces S7, S8 is the same as that shown in Figures 3$a$ to 3$c$.

Figure 5C:
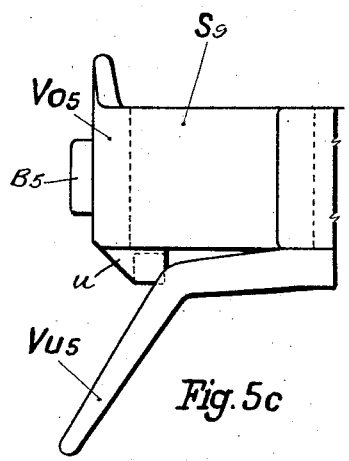
Fig. 5a is a front elevation, Fig. 5b a top plan view and Fig. 5c a side elevation of a fifth form of the invention.
Figure 5A:
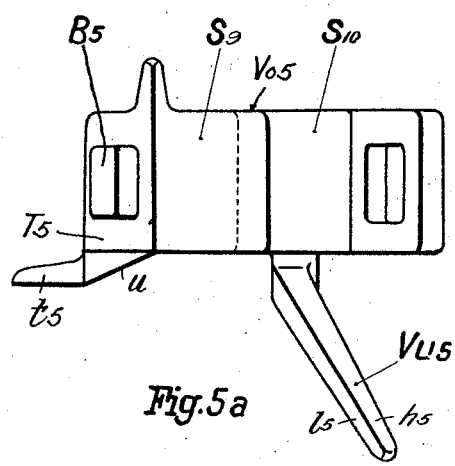
Figure 5B:
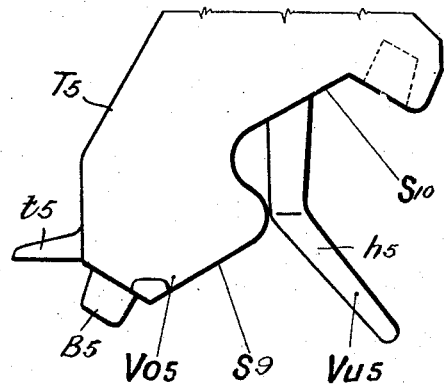

The constructional form shown in Figures 5$a$ to 5$c$ is not provided with the bevelled surfaces $f1$, $f2$, these being replaced by the guiding edge $u$ which is inclined to both longitudinal central planes, for increasing the guiding capacity of the head. This guiding edge on the underside of the upper projection V$o$5 forms the lower limit of the boss T5 receiving the pin B5, the member $t5$ forming a continuation of the said guiding edge.

The engaging member V$u$5 of Figs. 5$a$ to 5$c$ as shown in Fig. 5$c$ is displaced somewhat forwardly, and the surfaces S9, S10, $h5$ and $l5$ act in the same manner as the surfaces S7, S8 and $h4$, $l4$ of Figs. 4$a$ to 4$c$.

It should be expressly understood, that for the generatrix of the surfaces S1, S2 of the coupling heads shown in Figs. 2a to 5c, in place of a line containing a sine curve as shown in these figures any other suitably curved line may be used.

What I claim is:

1. An automatic central buffer coupling for railway vehicles, comprising a coupling head having an upper projection and a lower projection, opposite said upper projection, the upper projection having a vertical guiding surface inclined to the vertical central longitudinal plane and extending on both sides of said plane over the entire height of the upper projection of the coupling head, a buffer surface parallel and offset to said guiding surface and overlapping the latter and a surface connected to the overlapping portions of said guiding and buffer surfaces, so as to form an engaging member and a recess having the negative shape of the said engaging member for the reception of the engaging member of a second head, the lower projection having a vertical guiding surface inclined to the vertical central longitudinal plane and a guiding surface inclined forwardly and downwardly from the horizontal central longitudinal plane, an extension member on the upper projection extending vertically therefrom and a horizontal extension extending laterally therefrom and adapted to engage the guiding surfaces of a second coupling head, and coupling means for locking two heads in coupled relation for draft, as and for the purposes set forth.

2. An automatic central buffer coupling for railway vehicles, comprising a coupler head having an upper projection and a lower projection, opposite said upper projection, the upper projection having a vertical guiding surface inclined to the vertical central longitudinal plane and extending over the entire height of the upper projection of the coupling head, a buffer surface parallel and offset to said guiding surface and overlapping the latter and a surface connected to the overlapping portions of said guiding and buffer surfaces, so as to form an engaging member and a recess having the negative shape of the said engaging member for the reception of the engaging member of a second head, the lower projection having a vertical guiding surface inclined to the vertical central longitudinal plane and a guiding surface inclined forwardly and downwardly from the horizontal central longitudinal plane, a vertical surface on the upper projection extending laterally from the guiding surface thereon and inclined with respect to the vertical central longitudinal plane and to said guiding surface, an extension on the upper projection adjacent the buffer surface and having a surface thereon inclined with respect to the vertical central longitudinal plane and adapted to partially embrace a second head, said extension having an opening therein, and a locking member movable in the upper projection and capable of protruding from the vertical surface extending laterally from the guiding surface, said locking member being adapted to enter the opening in the extension of a second head in the coupled position of the heads, and coupling means for locking the coupling heads in coupled relation for draft, as and for the purposes set forth.

3. An automatic central buffer coupling for railway vehicles, comprising a coupling head having an upper projection and a lower projection opposite said upper projection, the upper projection having a vertical guiding surface on one side of the vertical central longitudinal plane of the coupling head and inclined thereto, a buffer surface on the other side of said plane parallel to said guiding surface, said guiding and buffer surfaces overlapping one another in the region of the vertical central longitudinal plane and a surface connected to the overlapping portions of said guiding and buffer surfaces so as to form an engaging member and a recess for the engaging member of a second head, the lower projection extending beyond the confines of said recess forwardly and downwardly therefrom and having a vertical guiding surface inclined to the vertical central longitudinal plane in an opposite direction to the vertical guiding surface of the upper projection and adapted to engage the corresponding vertical guiding surface of the lower projection of a second head for guiding the heads laterally into alignment, and a guiding surface inclined downwardly and forwardly from the horizontal central longitudinal plane of the coupling head, and coupling means for holding two heads in coupled relation.

4. An automatic coupling as claimed in claim 3 characterized by the provision of a locking member movable in the upper projection, and a recessed extension on the upper projection adapted to receive the locking member of a second head.

5. An automatic coupling as claimed in claim 3, characterized by the provision of a locking member movable in the upper projection, and a recessed extension on the upper projection adapted to receive the locking member of a second head, said locking member being arranged at the same height as and to one side of said engaging member.

6. A coupling as claimed in claim 3, characterized by the provision of vertically and horizontally disposed members on the upper projection adapted to engage the guiding surfaces of a second head.

In testimony whereof I have signed my name to this specification.

LÁSZLÓ KÜRTÖSSY.